(12) United States Patent
Endo (10) Patent No.: US 11,738,565 B2
(45) Date of Patent: Aug. 29, 2023

(54) PRINTING APPARATUS AND PRINTING METHOD

(71) Applicant: Seiko Epson Corporation, Tokyo (JP)

(72) Inventor: Tsunenobu Endo, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 94 days.

(21) Appl. No.: 17/329,401

(22) Filed: May 25, 2021

(65) Prior Publication Data

US 2021/0370685 A1 Dec. 2, 2021

(30) Foreign Application Priority Data

May 28, 2020 (JP) ................................. 2020-093028

(51) Int. Cl.
*B41J 2/21* (2006.01)
*G02B 5/04* (2006.01)
(Continued)

(52) U.S. Cl.
CPC ............... *B41J 2/21* (2013.01); *B41J 2/2114* (2013.01); *B41M 1/14* (2013.01); *B41M 3/00* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513;
(Continued)

(56) References Cited

U.S. PATENT DOCUMENTS

| | | | |
|---|---|---|---|
| 6,833,960 B1 | 12/2004 | Scarbrough et al. | |
| 2019/0193457 A1* | 6/2019 | Lister | B29D 11/00 |
| 2019/0232708 A1* | 8/2019 | Holmes | B42D 25/373 |

FOREIGN PATENT DOCUMENTS

| | | |
|---|---|---|
| CN | 110349490 | 10/2019 |
| CN | 111942044 | 11/2020 |

(Continued)

*Primary Examiner* — Manish S Shah
(74) *Attorney, Agent, or Firm* — WORKMAN NYDEGGER (57) ABSTRACT

The printed article includes a medium having a specular reflective layer, a first line composed of a first color formed at the medium, a second line formed at the medium in a second color and formed parallel to the first line, and a prism layer formed onto at least the first line, wherein when the medium is divided into a first region, a second region, and a third region that are continuous in parallel, the first line is disposed in any one region of the first region, the second region, and the third region, the second line is disposed in any one region other than the region where the first line was formed, the prism layer is disposed across two contiguous regions including the region formed with the first line, and the section of the prism layer has a shape of a portion of the non-circular arc approximating the ellipse.

10 Claims, 7 Drawing Sheets

(51) Int. Cl.
 *B41M 3/06* (2006.01)
 *B44F 1/04* (2006.01)
 *B41M 3/00* (2006.01)
 *B44F 7/00* (2006.01)
 *B41M 1/14* (2006.01)
 *B44F 1/08* (2006.01)
 *B41J 25/00* (2006.01)

(52) U.S. Cl.
 CPC ............... *B41M 3/06* (2013.01); *B44F 1/04* (2013.01); *B44F 1/08* (2013.01); *B44F 7/00* (2013.01); *G02B 5/04* (2013.01); *B41J 2025/008* (2013.01)

(58) Field of Classification Search
 CPC .... B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

FOREIGN PATENT DOCUMENTS

| JP | 2011-215201 | 10/2011 |
| JP | 2012-066482 | 4/2012 |
| JP | 6677834 | 3/2020 |

\* cited by examiner

PRINTING APPARATUS AND PRINTING METHOD

The present application is based on, and claims priority from JP Application Serial Number 2020-093028, filed May 28, 2020, the disclosure of which is hereby incorporated by reference herein in its entirety.

BACKGROUND

1. Technical Field

The disclosure relates to a printing apparatus and a printing method.

2. Related Art

Conventionally, printed materials having visual effects that impart a stereoscopic feel to an image using lenticular lenses or different colors by viewing angles are known. Japanese Unexamined Patent Application Publication No. 2011-215201 discloses a technology in which a lenticular lens formed by a spacer layer and a microlens layer is disposed on an image layer to obtain the visual effect described above.

However, in order to obtain a printed object having a visual effect using the technique described in Japanese Unexamined Patent Application Publication No. 2011-215201, it is necessary to place the printed image at the focal point of the lenticular lens. In other words, a thickness of the lenticular lens becomes a focal length, which leads to a problem in that the printed material becomes thicker. Furthermore, because the lens material is harder than paper, film, or the like that serves as the medium of the printed material, it is difficult to bend and deform the printed material.

SUMMARY

Printed material comprising: a medium having a specular reflective layer for visible light; a first line composed of a first color formed by discharging ink onto the medium; a second line formed by discharging, onto the medium, ink composed of a second color different from the first color, and formed parallel to the first line; and a prism layer formed by discharging at least an ink that does not include color material to at least the first line, wherein when a portion of the medium is pseudo-divided so that a plurality of continuous regions are formed by repeating a first region, a second region, and a third region, in one set, that are continuous linear regions in parallel, the first line is disposed in any one of the first region, the second region, and the third region in the one set, the second line is disposed in any region other than the region formed with the first line, of the first region, the second region, and the third region in the one set, and the prism layer spans two continuous regions including the region formed with the first line of the first region, the second region, and the third region, in the one set, and is disposed parallel to the linear regions, and a section of the prism layer has a shape of a portion of a non-circular arc that approximates an ellipse.

A printing method comprising forming a medium having a specular reflective layer for visible light;

discharging ink onto the medium to form a first line composed of a first color;

discharging to the medium a second color ink that is different from the first color to form a second line parallel to the first line;

forming a prism layer by discharging ink that does not include a color material onto at least the first line; and when a portion of the medium is pseudo-divided so that a plurality of continuous regions are formed by repeating a first region, a second region, and a third region, in one set, that are continuous linear regions in parallel, the first line is formed in any one of the first region, the second region, and the third region in the one set;

the second line is formed in any region other than the region formed with the first line, of the first region, the second region, and the third region;

the prism layer spans two continuous regions including the region formed with the first line, of the first region, the second region, and the third region, in the one set, and is formed parallel to the linear region, and a section of the prism layer has a shape of a part of a non-circular arc that approximates an ellipse.

DESCRIPTION OF EXEMPLARY EMBODIMENTS

1. Exemplary Embodiment 1

1-1. Schematic Constitution of a Printing Apparatus

A schematic constitution of a printing apparatus 1 according to the exemplary embodiment will be described with reference to FIG. 1. Note that, in the present embodiment, the printing apparatus 1 that is equipped with a rotary drum 35 that supports a long medium 70 in a cylindrical shape, and that conveys the medium 70 using a roll-to-roll method will be described as an example.

Figure 1:
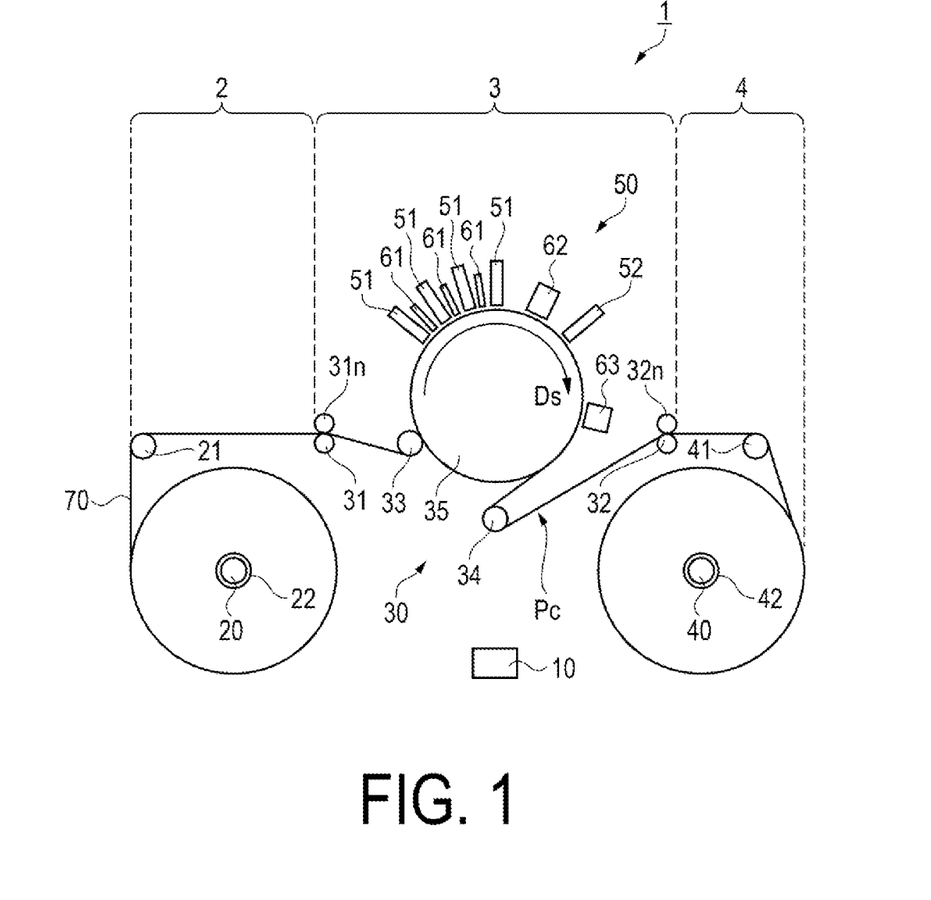
FIG. 1 is a schematic view illustrating a general overall constitution of a printing apparatus according to an Exemplary Embodiment 1.
Figure 3:
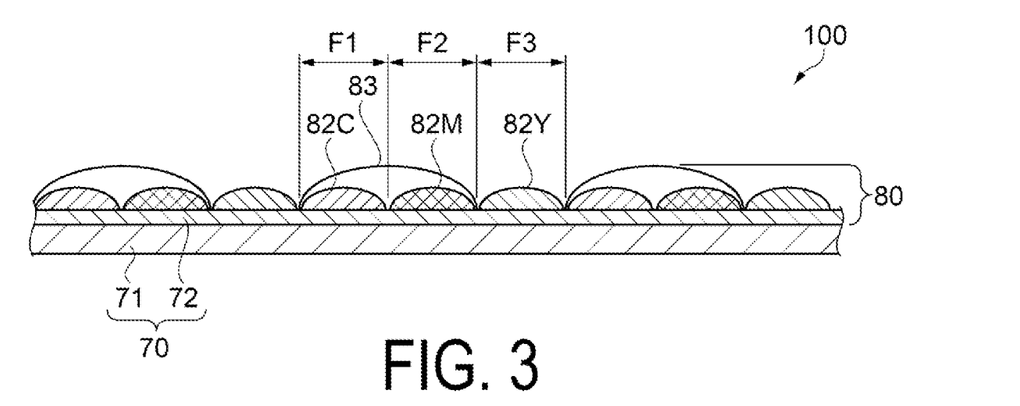
FIG. 3 is a cross-sectional view taken along the line A-A in FIG. 2.

As illustrated in FIG. 1, the printing apparatus 1 includes a feeding shaft 20 configured to feed the medium 70, a transport unit 30 configured to transport the medium 70, a printing unit 50 configured to print on the medium 70 conveyed by the transport unit 30, a winding shaft 40 configured to wind the printed medium 70, and a control unit 10 configured to control operations of portions of the printing apparatus 1. In the printing apparatus 1, the long medium 70 having both ends wound in a roll shape around the feeding shaft 20 and the winding shaft 40 is tensioned along a transport path Pc. The medium 70 receives image printing while being transported in the transport direction Ds at the rotary drum 35 disposed between the feeding shaft 20 and the winding shaft 40. As illustrated in FIG. 3, the medium 70 includes a substrate 71, and a specular reflective layer 72 for visible light disposed on a front surface of the substrate 71. Types of the substrate 71 are broadly divided into a paper-based type and a film-based type. To give specific examples, the paper-based type includes woodfree paper, cast paper, art paper, coated paper, and the like, and the film-based type includes synthetic paper, Polyethylene terephthalate (PET), polypropylene (PP), and the like. The specular reflective layer 72 is a metal thin film such as aluminum, nickel, chromium, or stainless steel, and the like.

The printing apparatus 1 is constituted by three regions: a feeding region 2 configured to feed the medium 70 from the feeding shaft 20; a process region 3 configured to record an image on the medium 70 fed from the feeding region 2; and a winding region 4 that winds the recorded medium 70 recorded with the image in the process region 3 around the winding shaft 40. Note that in the following description, of both surfaces of the medium 70, the surface on which the image is recorded will be referred to as a front surface and the reverse side surface of the front surface will be referred to as a back surface.

The feeding region 2 includes the feeding shaft 20 around which an edge of the medium 70 is wound, and a driven roller 21 on which the medium 70 drawn out from the feeding shaft 20 is wound. The feeding shaft 20 supports the medium 70 with the edge thereof wound on the feeding shaft 20, so that the front surface of the medium 70 faces outward. In addition, when the feeding shaft 20 is rotated clockwise in FIG. 1, the medium 70 wound around the feeding shaft 20 is fed to the process region 3 via the driven roller 21. The driven roller 21 is in contact with the medium 70 and is driven to rotate in the transport direction Ds of the medium 70 in response to a frictional force between the driven roller 21 and the transported medium 70. The medium 70 is wound around the feeding shaft 20 via a core pipe that is detachable from the feeding shaft 20. When the medium 70 of the feeding shaft 20 is used up, a new core pipe 22 around which the rolled medium 70 is wound is mounted on the feeding shaft 20.

The process region 3 includes the transport unit 30 and a printing unit 50 configured to perform printing on the medium 70 transported by the transport unit 30. The transport unit 30 is provided with a front driving roller 31, a rotary drum 35 that supports the medium 70 in a cylindrical shape, and a rear driving roller 32. Recording heads 51,52 and UV irradiators 61,62,63 are disposed in the printing unit 50.

In the process region 3, the medium 70 fed from the feeding region 2 is supported by the rotary drum 35, and processing on the medium 70 is performed appropriately by the recording heads 51,52 and the UV irradiators 61,62,63 disposed along an outer circumferential surface of the rotary drum 35, and an image is recorded on the medium 70. Upstream of this process region 3 is disposed the front driving roller 31 for transporting the medium 70 toward the rotary drum 35. Downstream of the process region 3 is disposed the rear driving roller 32 that transports the medium 70 toward the winding shaft 40. In this way, the medium 70 transported from the front driving roller 31 to the rear driving roller 32 is supported by the rotary drum 30.

The front driving roller 31 is a cylindrical shape or column-shaped and includes a plurality of minute protrusions formed on the outer circumferential surface thereof by thermal spraying. The medium 70 fed from the feeding region 2 is wound on from the rear surface side. In addition, by the front driving roller 31 being rotated clockwise in FIG. 2, the medium 70 is fed from the feeding region 2 downstream in a transport path. A nip roller 31n is disposed to oppose the front driving roller 31. The nip roller 31n touches the front surface of the medium 70 while being urged toward the front driving roller 31, and the medium 70 becomes sandwiched between the nip roller 31n and the front driving roller 31. This makes it possible to secure a frictional force between the front driving roller 31 and the medium 70 and reliably perform transport of the medium 70 using the front driving roller 31.

The rotary drum 35 is a cylindrical drum that is rotatably supported, for example, having a diameter of 400 mm, and winds the medium 70, which is transported from the front driving roller 31 to the rear driving roller 32, from the rear surface side. The rotary drum 35 is driven to rotate in the transport direction Ds of the medium 70 by receiving friction force with the transported medium 70 while supporting the medium 70 from the rear surface side. The process region 3 is equipped with driven rollers 33,34 that change a direction of travel of the medium 70 on both sides in the transport direction Ds of the region on which the medium 70 is wound onto the rotary drum 35. The driven roller 33 turns the surface of the medium 70 advancing direction toward the rotary drum 35, with the front surface of medium 70 wound between the front driving roller 31 and the rotary drum 35 in the transport direction Ds. The driven roller 34 turns the front surface of the medium 70 wound between the rotary drum 35 and the rear driving roller 32 to the transport direction Ds to fold the advancing direction of the medium 70. By folding back the medium 70 respectively upstream and downstream of the rotary drum 30 in the transport direction Ds, it is possible to secure a long length of the part at which the medium 70 is wound on the rotary drum 30.

The rear driving roller 32 is a cylindrical shape or is column shaped having a plurality of minute protrusions formed on the outer circumferential surface of the rear driving roller 32 by thermal spraying. The medium 70 conveyed from the rotary drum 30 via the driven roller 34 is wound from the rear surface side. The rear driving roller 32 is rotated clockwise in FIG. 1 to convey the medium 70 to the winding region 4. The nip roller 32n is disposed with respect to the rear driving roller 32. This nip roller 32n touches the front surface of the medium 70 while being urged toward the rear driving roller 32, and the medium 70 is sandwiched between the nip roller 32n and the rear driving roller 32. This makes it possible to ensure a frictional force between the rear driving roller 32 and the medium 70 and reliably transport the medium 70 using the rear driving roller 32.

In this way, the medium 70 conveyed from the front driving roller 31 to the rear driving roller 32 is supported by the outer circumferential surface of the rotary drum 30. Then, in the process region 3, the plurality of recording heads 51 corresponding to different colors is disposed for printing a color image on the front surface of the medium 70 supported by the rotary drum 35. In the present embodiment, cyan is a first color, magenta is a second color, yellow is a third color, and four recording heads 51 corresponding to black are aligned in this color order in the transport direction Ds.

Figure 2:
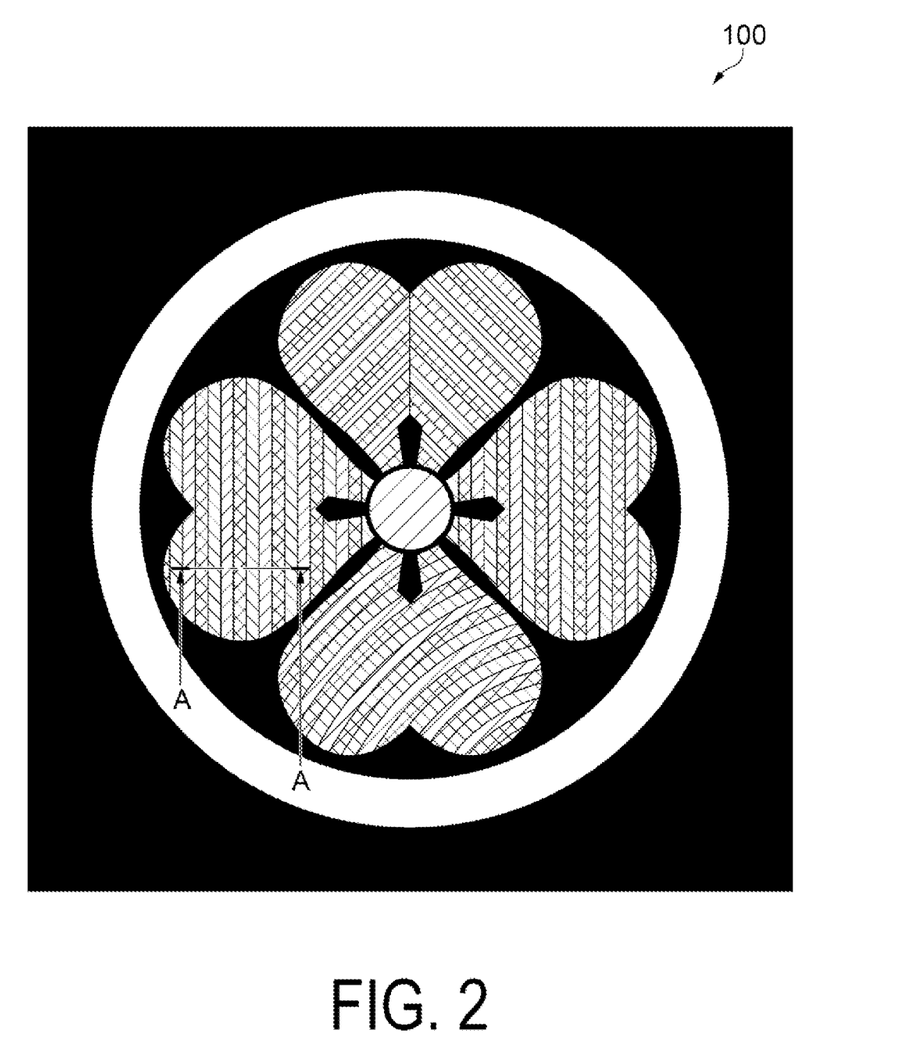
FIG. 2 is a plan view illustrating the constitution of the printed material.

Each recording head 51 faces the front surface of the medium 70 wound on the rotary drum 35 with slight clearance, and discharges a corresponding color of ink onto the medium 70 from a nozzle included in the recording head 51 using an ink-jet method. As shown in FIG. 2 and FIG. 3, the printing apparatus 1 according to the exemplary embodiment uses ultraviolet light curable ink that cures by irradiating with ultraviolet rays, and forms a first line 82C composed of the first color, and a second line 82M composed of the second color, and a third line 82Y composed of the third color. Hereinafter, the ultraviolet light curable ink is also referred to as "UV ink."

The process region 3 is equipped with UV irradiators 61,62 for curing the ink and fixing it to the medium 70. This ink curing is implemented by separately using two stages of temporary curing and final curing. A UV irradiator 61 for temporary curing is disposed between each of the plurality of recording heads 51. The UV irradiator 61 irradiates with ultraviolet radiation with a weak irradiation intensity, thereby temporarily curing the ink to a degree that is adequately slow compared to a case where the wet spreading of the ink is not irradiated with the ultraviolet light. This suppresses color mixing such as mixture of inks having different colors.

A UV lamp 62 for final curing is disposed downstream of the plurality of printing heads 51 in the transport direction Ds. The UV irradiator 62 causes the UV irradiator 61 to irradiate with ultraviolet radiation with a stronger irradiation intensity, thereby curing the ink to the extent that the wet spreading of the ink stops. A color image formed by the plurality of recording heads 51 is cured by the UV irradiator 62 and fixed to the medium 70.

Furthermore, the recording head 52 are disposed downstream of the UV irradiator 62 in the transport direction Ds. The recording head 52 faces the front surface of the medium 70 wound on the rotary drum 35 with slight a clearance. A colorless UV ink is discharged onto the medium 70 using the ink-jet method. Hereinafter, UV ink that does not include a color material is also referred to as transparent ink. In other words, the transparent ink is further discharged to the first to the third lines 82C, 82M, 82Y formed by the recording head 52.

The UV irradiator 63 is disposed downstream of the recording head 52 in the transport direction Ds. The UV irradiator 63 cures the transparent ink discharged by the recording head 52 by irradiating with ultraviolet radiation with a stronger irradiation intensity than the UV irradiator 61. This fixes the transparent ink to the front surface of the medium 70. As illustrated in FIG. 3, the printing apparatus 1 according to the present embodiment uses transparent ink to form a prism layer 83 having a sectional shape of a portion of a non-circular arc that approximates an ellipse. In this way, in the process region 3, the discharge and curing of the ink is appropriately implemented on the medium 70 wound around the outer circumference of the rotary drum 35. The medium 70 is conveyed to the winding region 4 by a rear driving roller 32.

In addition to the winding shaft 40 around which the edge of the medium 70 has been wound, the winding region 4 includes a driven roller 41 for winding the medium 70 between the winding shaft 40 and the rear driving roller 32 from the rear surface side of the medium 70. The winding shaft 40 supports the medium 70 by winding the edge of the medium 70 around the winding shaft 40 with the front surface of the medium 70 facing outward. In other words, when the winding shaft 40 is rotated clockwise in FIG. 1, the medium 70 conveyed from the rear driving roller 32 is wound around the winding shaft 40 via the driven roller 41. In this regard, the medium 70 is wound around the winding shaft 40 via a core pipe that is detachable from the winding shaft 40. Therefore, when the medium 70 wound around the winding shaft 40 becomes full, it is possible to detach the medium 70 together with the core pipe 42.

1-2. Constitution of Printed Material

Next, a constitution of a printed material having a visual effect will be described with reference to FIG. 2 and FIG. 3.

The printed material 100 has a four-leaved creeping lady's sorrel (*Oxalis corniculata*) printed on the medium 70. Disposed on the four leaf portions are a first line 82C formed using cyan ink, a second line 82M formed using magenta ink parallel to the first line 82C, a third line 82Y formed using yellow ink parallel to the first and second lines 82C, 82M, and a prism layer 83 formed using transparent ink. The portions of the four leaves have a specular reflective layer 72 that includes the substrate 71, first through third lines 82C, 82M, 82Y, and the prism layer 83 to demonstrate a visual effect. The first through third lines 82C, 82M, and 82Y form parallel lines extending in a longitudinal, lateral, diagonal, and arc-like fashion on each leaf. This allows the printed material 100 to exhibit a complex color change as a visual effect.

The medium 70 is a linear region, and the first region F1, the second region F2, and the third region F3 that are continuous in parallel are divided in a pseudo-manner so that a plurality of continuous regions are repeated as one group. FIG. 3 is a sectional view of the continuous first through third regions F1, F2, F3. As shown in FIG. 3, the first line 82C is disposed in any one of the first F1, second F2, third F3 regions in one set. The second line 82M is disposed in one set in any one of the first F1, second F2, third F3 regions, other than the regions where the first line 82C is formed. The third line 82Y is disposed in one set of first regions F1, second regions F2, and third regions F3 in which the first line 82C is also not formed with the second line 82M. In the present embodiment, the first line 82C is disposed in the first region F1, the second line 82M is disposed in the second region F2, and the third line 82Y is disposed in the third region F3. Note that the combination of the first to third lines 82C, 82M, and 82Y and the first to third regions F1, F2, and F3 are not limited thereto, and other combinations may be used.

The prism layer 83 is disposed in one set in a region spanning two consecutive regions including the region where the first line 82C is formed in the first region F1, the second region F2, and the third region F3 in one set. Also, the prism layer 83 is disposed parallel to each of the regions F1 to F3 extending in a linear manner. The prism layer 83 of the present embodiment is disposed in a region spanning the first region F1 and the second region F2. In other words, the prism layer 83 is formed on the first line 82C and the second line 82M.

The width of the first to third regions F1, F2, F3, that is, the width of the first to third lines 82C, 82M, 82Y is desirably equal to or less than 85 μm, which corresponds to the resolution of near vision 1.0. Near vision is a visual acuity that can distinguish two points at 30 cm apart as two points. Near visual acuity 1.0 is a visual acuity that is 1/60 degrees and is able to identify two points with a 1 minute viewing angle. 30 cm is near the distance when a human reads printed material such as this, and near visual acuity 1.0 is an unimpaired vision for leading a normal everyday life.

The section of the prism layer 83 forms a non-circular arc shape that approximates an ellipsoid having a large eccentricity. The width of the prism layer 83 is approximately 160 μm, and the film thickness thereof is 4-40 μm. In other words, the film thickness of the prism layer 83 is extremely thin compared to the width, and the light incident on the prism layer 83 is thinner than the thickness that focuses on the first line 82C. Incidentally, in order to focus light incident on the prism layer 83 on the first line 82C, the same film thickness as the radius of the arc is required.

Next, the visual effect of the printed material 100 will be described with reference to FIG. 4 and FIG. 5.

Figure 4:
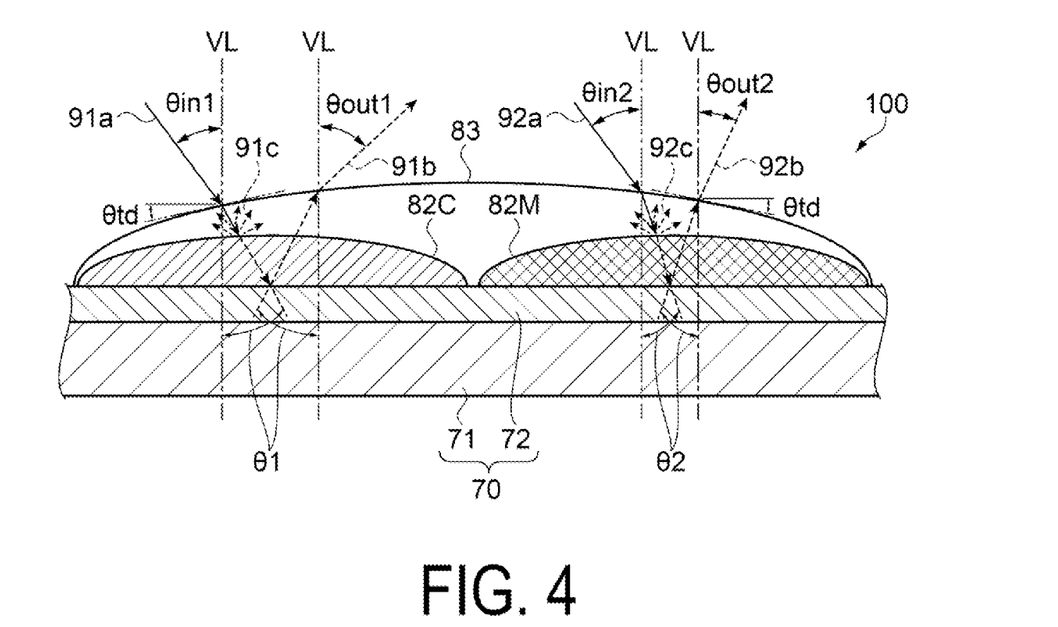
FIG. 4 is an enlarged sectional view illustrating a shape of a first line, a second line, and a prism layer.
Figure 5:
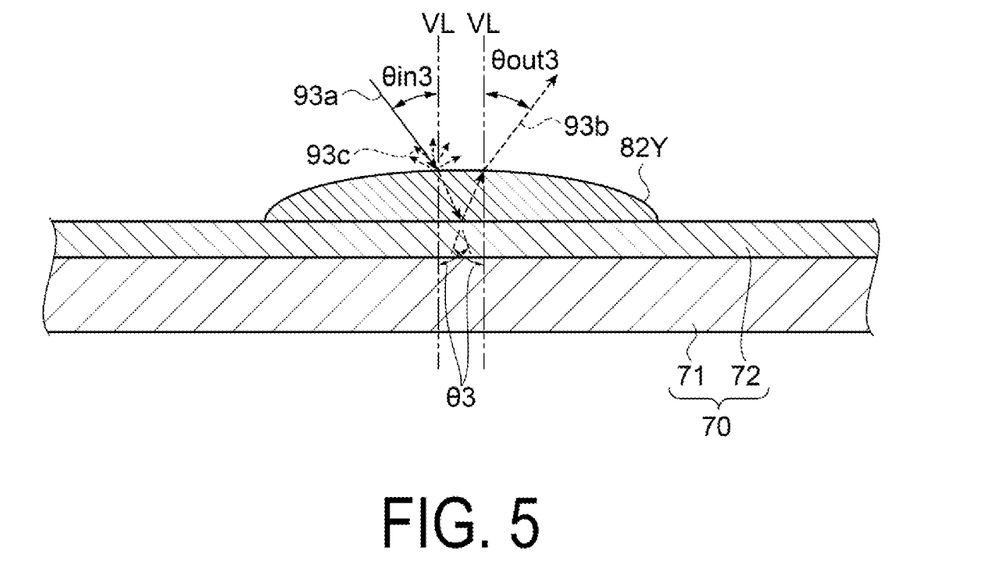
FIG. 5 is an enlarged sectional view illustrating the shape of a third line.

As illustrated in FIG. 4, the section of the prism layer 83 forms an elliptical arc shape with the boundary between the first line 82C and the second line 82M as the apex. Therefore, the inclination between a tangent line at a position where the first incident light 91a that enters the prism layer 83 and reaches the first line 82C is incident on the prism layer 83, and a tangent line at a position where the second incident light 92a that enters the prism layer 83 and reaches the second line 82M is incident on the prism layer 83. Because the prism layer 83 has an elliptical shape with a large eccentricity, the inclination θtd of the tangent line on the first line 82C can be approximated as being constant. Also, the slope of the tangent line on the second line 82M can be approximated to be a constant that is different from the slope on the first line 82C. Said another way, the prism layer 83 also can be said to have a structure having a prism in which the slope of the tangent line has a positive slope+ θtd and a prism with a negative slope of −θtd.

In the following description, the line width of the first line 82C and the line width of the second line 82M are 85 μm, and the height is 10 μm. The width of the prism layer 83 is 170 μm and the height is 20 μm. In such a case, the inclination θtd of the tangent line of the prism layer 83 above the first line 82C is +8° with respect to the flat surface of the medium 70. The slope of the tangent line of the prism layer 83 above the second line 82M is −8° relative to the flat surface of the medium 70. Additionally, the refractive index n1 of the air is 1.0, and the refractive index n2 of the prism layer 83 and the refractive index n2 of the first line 82C and the second line 82M are the same 1.5.

A first incident light 91a that is incident on the first line 82C and a first emitted light 91b that is the specular reflection thereof will be described. A relationship of an angle θin1 with respect to a vertical line VL of the first incident light 91a that enters the prism layer 83 from the air layer and reaches the specular reflective layer 72 directly through the first line 82C, and an angle θout1 with respect to the vertical line VL of the first emitted light 91b that reflects off the specular reflective layer 72 from the prism 83 directly through the first line 82C is determined by the following equation using Snell's law.

[Mathematical Equation 1]

$$\theta_{out1} = \sin^{-1}\left(\frac{n_2}{n_1}\sin\left(\sin^{-1}\left(\frac{n_1}{n_2}\sin(\theta_{in1}-\theta_{td})\right)+2\theta_{td}\right)\right)-\theta_{td} \quad (1)$$

For example, when the first incident light 91a is incident on the prism layer 83 from the air layer at an angle of θin1=30° with respect to the vertical line VL of the medium 70, the incident angle incident on the prism layer 83 is θin1−θtd. The first incident light 91a refracts at its boundary to an angle θ1≈22° relative to the vertical line VL.

The first incident light 91a is reflected light that travels straight through the prism layer 83 and the first line 82C and specularly reflects off the specular reflective layer 72, and again travels straight through the first line 82C and the prism layer 83 to reach the air layer. When the incident light is incident on the air layer from the prism layer 83 at an angle θ1=−22° with respect to the vertical line VL of the medium 70, the incident angle incident on the air layer becomes θ1+θtd, so the angle of refraction at the boundary increases. The incident light is refracted at an angle θout1≈−41° relative to the vertical line VL and exits the prism layer 83 as the first emitted light 91b.

The first incident light 91a is white light. The first incident light 91a is diffused at the surface of the first line 82C with the cyan color being the ink color of the first line 82C as diffuse incident light 91c. In other words, the first line 82C acts as a color filter excluding white light to cyan color. When the first incident light 91a enters the first line 82C, the first incident light 91a changes from white light to red light from which cyan color has been removed, and the incident light is emitted from the prism layer 83 as the red first emitted light 91b. Note that in the cyan diffuse incident light 91c diffusely reflected by the surface of the first line 82C, the amount of light in the same direction as the first emitted light 91b is significantly less than the amount of light of the first emitted light 91b, so only red light, which is the first emitted light 91b, is visible.

A second incident light 92a that is incident on the second line 82M and a second emitted light 92b that is the specularly reflected light will be described. A relationship of an angle θin2 with respect to the vertical line VL of the second incident light 92a that enters the prism layer 83 from the air layer and passes directly through the second line 82M to the specular reflective layer 72 and an angle θout2 with respect to the vertical line VL of the second emitted light 92b that reflects off the specular reflective layer 72 and passes directly through the second line 82M into the air layer from the prism layer 83 is determined by the following equation using Snell's law.

[Mathematical Equation 2]

$$\theta_{out2} = \sin^{-1}\left(\frac{n_2}{n_1}\sin\left(\sin^{-1}\left(\frac{n_1}{n_2}\sin(\theta_{in2}+\theta_{td})\right)-2\theta_{td}\right)\right)+\theta_{td} \quad (2)$$

The second incident light 92a is light parallel to the first incident light 91a. For example, when the second incident light 92a is incident on the prism layer 83 from the air layer at an angle of θin2=30° with respect to the vertical line VL of the medium 70, the incident angle that is incident on the prism layer 83 is θin2+θtd. In other words, the incident angle of the second incident light 92a is greater than the incident angle of the first incident light 91a, and for that reason, the second incident light 92a refracts more than the first incident light 91a, and becomes the angle θ2≈16° with respect to the vertical line VL at the boundary.

The second incident light 92a is incident light that travels straight through the prism layer 83 and the second line 82M and specularly reflects off the specular reflective layer 72, and again travels straight through the second line 82M and the prism layer 83 to reach the air layer. When the incident light is incident on the air layer from the prism layer 83 at an angle θ2=−16° with respect to the vertical line VL of the medium 70, the incident angle incident on the air layer becomes θ2−θtd, so the angle of refraction at the boundary is reduced. The reflected light is refracted at an angle θout2≈−20° relative to the vertical line VL and exits the prism layer 83 as a second emitted light 92b.

The second incident light 92a is white light. The second incident light 92a is diffused on the surface of the second line 82M so that the magenta color, which is the ink color of the second line 82M, is the diffuse incident light 92c. In other words, the second line 82M acts as a color filter that excludes the magenta color from white light. The second incident light 92a changes from white light to green light from which the magenta color has been removed when entering the second line 82M, and the incident light is emitted from the prism layer 83 as the second emitted light 92b of the green color. Note that in the magenta-color diffused/reflected light 92c diffusely reflected off the front surface of the second line 82M, the quantity of light in the same direction as the second emitted light 92b is significantly less than the quantity of light of the second emitted light 92b, so only the green light, which is the second emitted light 92b, is visible.

A third incident light 93a that is incident on the third line 82Y and a third emitted light 93b, which is the specularly reflective light, will be described with reference to FIG. 5. The line width and height of the third line 82Y are the same as the first and second lines 82C, 82M. The inclination of the tangent line directly above the third line 82Y is 0° relative to the flat surface of the medium 70. A relationship between the angle θin3 with respect to the vertical line VL of the third incident light 93a that enters the third line 82Y from the air layer and reaches the specular reflective layer 72, and the angle θout3 with respect to the vertical line VL of the third emitted light 93b that is reflected by the specular reflective layer 72 and exits from the third line 82Y to the air layer is determined by the following equation.

[Mathematical Equation 3]

$$\theta_{out3} = \theta_{in3} \quad (3)$$

The third incident light 93a is light parallel to the first incident light 91a. For example, if the third incident light 93a is incident on the third line 82Y from the air layer at an angle of θin3=30° with respect to the vertical line VL of the medium 70, the incident angle incident on the third line 82Y is the same as the angle θin3. In other words, the third incident light 93a incident at the incident angle of 30° refracts at the boundary to the angle θ3≈20° with respect to the vertical line VL.

The third incident light 93a passes direction within the third line 82Y and becomes incident light that specularly reflects off the specular reflective layer 72, and again travels straight within the third line 82Y to reach the air layer. When the incident light is incident on the air layer from the third line 82Y at an angle θ3=−20° with respect to the vertical line VL of the medium 70, the incident light is refracted at an angle θout3≈−30° with respect to the vertical line VL and exits from the third line 82Y as the third emitted light 93b.

The third incident light 93a is white light. The third incident light 93a is diffused on the front surface of the third line 82Y so that the yellow color, which is the ink color of the third line 82Y, is the diffused/reflected light 93c. In other words, the third line 82Y acts as a color filter excluding white light to yellow color. The third incident light 93a changes from white light to blue light having a yellow color removed when entering the third line 82Y, and the incident light is emitted from the third line 82Y as the blue third emitted light 93b. Note that in the yellow colored diffused/reflected light 93c diffusely reflected off the surface of the third line 82Y, the quantity of light in the same direction as the third emitted light 93b is significantly less than the quantity of light of the third emitted light 93b, so only blue light, which is the third emitted light 93b, is visible.

1-3. Printing Method

Figure 6:
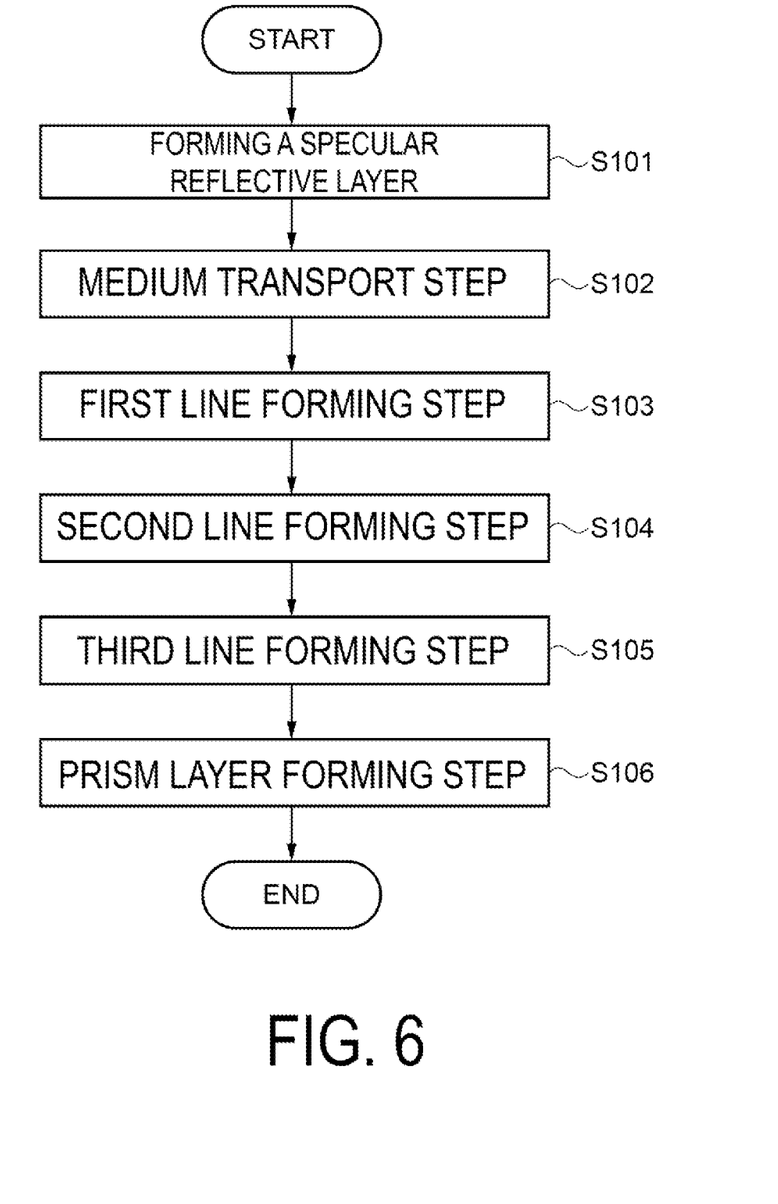
FIG. 6 is a flowchart to describe a printing method.

Next, a method of printing printed material will be described with reference to FIG. 6.

Step S101 is a specular reflective layer forming step of forming a medium 70 having a specular reflective layer 72 for visible light. At step S101, a specular reflective layer 72 is disposed by a film forming method such as plating, vapor deposition, or thermal spraying, or the like, on a paper-based or film-based substrate 71, for the first to third incident light 91a, 92a, and 93a. It is possible to adopt metal materials including aluminum, nickel, chromium, stainless steel, and others. In addition to the film forming method described above, the method of forming the specular reflective layer 72 may be a method of adhering and transferring a metal material in a foil shape, a method of coating a powdered metal material onto the substrate 71, and polishing a surface thereof. Note that a metal film such as aluminum, nickel, chromium, stainless steel, or the like can also be used as the medium 70. In this case, the step of step S101 is not required. The medium 70 having the specular reflective layer 72 is tensioned along a transport path Pc of the printing apparatus 1.

Step S102 is a medium transport step for transporting the medium 70. The control unit 10 controls the transport unit 30 to transport the medium 70 suspended along the transport path Pc in the transport direction Ds.

Step S103 is a first line forming step of discharging ink onto the medium 70 to form a first line 82C of the first color. The controller 10 controls the recording head 51 that discharges cyan ink to form a first line 82C in the first region F1.

Step S104 is a second line forming step of discharging the second color of ink on the medium 70 different from the first color to form a second 82M line parallel to the first 82C. The controller 10 controls the recording head 51 that discharges the magenta ink to form the second line 82M in the second region F2.

Step S105 is a third line forming step of discharging ink on the medium 70 different than the first color and the second color to form the third 82Y parallel to the first 82C and second 82M lines. The control unit 10 controls the recording head 51 that discharges the yellow ink to form a third line 82Y in the third region F3.

Step S106 is a prism layer forming step of forming the prism layer 83 by discharging ink that does not include a color material on at least the first line 82C. The control unit 10 controls the recording head 52 that discharges the transparent ink, and forms the prism layer 83 in the linear region spanning the first region F1 and the second region F2 that is continuous with the first region F1. The transparent ink is a UV ink and cures to a sectional shape with a portion of a non-circular arc that approximates the ellipse by UV radiation irradiated from the UV irradiator 63.

Note that in the printing method described above, for convenience of explanation, the first to third line forming steps and the prism layer forming step have been described in steps S103 to S106, but the steps S103 to S106 are performed substantially simultaneously by the control of the control unit 10 based on the printed data of the printed material 100.

Note that in the present embodiment, the first color is cyan, the second color is magenta, and the third color is yellow, but the present disclosure is not limited to this combination. Furthermore, while the first to third colors are described as cyan, magenta, and yellow, which are color reducing mixtures, red, green, and blue, which are mixed colors, may be used, or other colors may be used.

Figure 7:
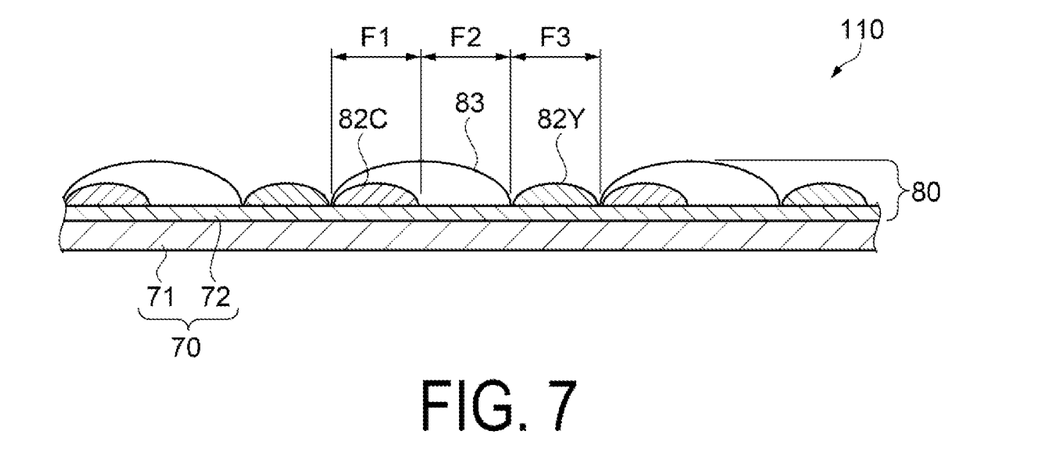
FIG. 7 is a sectional view illustrating another example of a printed material.
Figure 8:
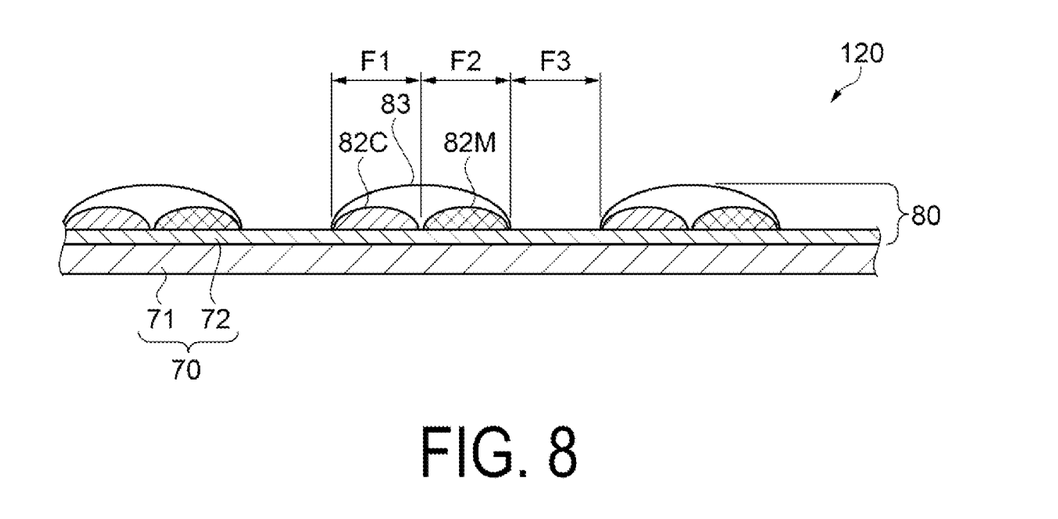
FIG. 8 is a sectional view illustrating another example of a printed material.

In the present embodiment, the first line 82C is formed in the first region F1, the second line 82M is formed in the second region F2, and the third line 82Y is formed in the third region F3. However, the present disclosure is not limited thereto. For example, as illustrated in FIG. 7, the second line 82M may also be a printed material 110 in which neither the second line 82M nor the third line 82Y is formed in the second region F2, or the printed material 120 in which neither the second line 82M nor the third line 82Y is formed in the third region F3, as illustrated in FIG. 8. Furthermore, the second regions F2 in FIG. 7 and the third regions F3 in FIG. 8 may be printed materials in which lines of black and white are formed. The same visual effect as the printed material 100 can be exhibited even with a printed material having such a constitution.

Still further, illustrated in the present embodiment, the printed material 100 is arranged with the prism layer 83 spanning the first region F1 and the second region F2, but it may also be a printed material disposed with the prism layer 83 in a region spanning the third region F3 and the first region F1.

Furthermore, in the present embodiment, the first line 82C, the second 82M, and the third 82Y are exemplified as color filters excluding from white light to ink color. However, the first line 82C, the second line 82M, and the third line 82Y may be color filters that transmit ink colors from white light and do not transmit other colors.

As described above, according to the printing apparatus 100 and the printing method of the exemplary embodiment, the following effects can be obtained.

The printed material 100 includes a specular reflective layer 72 formed on the medium 70, a first line 82C formed on the specular reflective layer 72, a second line 82M, and a prism layer 83. Because the prism layer 83 is formed across two regions including regions where the first line 82C is formed, the prism layer 83 has a positive and negative slope with a tangent line above the first line 82C and a tangent line above the second line 82M. As a result, the refractive angle of the first incident light 91a that reaches the first line 82C via the prism layer 83 differs from the refractive angle of the second incident light 92a that reaches the second line 82M via the prism layer 83. Similarly, the refractive angle of the first emitted light 91b that specularly reflects off the specular reflective layer 72 and exits the prism layer 83 via the first line 82C differs from the refractive angle of the second emitted light 92b that is specularly reflected by the specular reflective layer 72 and exits the prism layer 83 via the second line 82M. The printed material 100 obtains a visual effect because of this difference in refractive angles. Because the first line 82C, the second line 82M, and the prism layer 83 are formed of ink, the thickness of the printed material 100 can be reduced. This allows the printed material 100 easily to be bent or deformed.

The prism layer 83 of the printed material 100 is thinner than the thickness that focuses on the first line 82C. In other words, printed material 100 can be obtained that is thinner than a printed material that obtains visual effects using a lenticular lens with a thickness of focal length.

The printed material 100 comprises a first line 82C formed of ink of a first color, a second line 82M formed of a second color ink, and a third line 82Y formed of a third color ink. For this reason, a visual effect of the printed material 100 is improved.

The prism layer 83 is formed from an ultraviolet light curable ink. Because it is possible three-dimensionally to cure the ink, the ultraviolet light curable ink can suitably form the prism layer 83 having a shape of a portion of the non-circular arc that approximates the ellipse.

The width of the first to third regions F1, F2, F3, that is, the widths of the first to third lines 82C, 82M, 82Y disposed in the first through third regions F1, F2, F3 may have a resolution of near visual acuity 1.0 or higher. As a result, the visual effect of the printed material 100 is more favorably visible.

The printing method includes forming a medium 70 having a specular reflective layer 72, forming a first line 82C composed of a first color, forming a second line 82M parallel to the first line 82C composed of the second color, and forming a prism layer 83 on at least the first line 82C. Because the prism layer 83 is formed across two regions including regions where the first line 82C is formed, the prism layer 83 has a positive and negative slope with a tangent line above the first line 82C and a tangent line above the second line 82M. As a result, the refractive angle of the first incident light 91a that reaches the first line 82C via the prism layer 83 differs from the refractive angle of the second incident light 92a that reaches the second line 82M via the prism layer 83. Similarly, the refractive angle of the first emitted light 91b that specularly reflects off the specular reflective layer 72 and exits the prism layer 83 via the first line 82C differs from the refractive angle of the second emitted light 92b that is specularly reflected by the specular reflective layer 72 and exits the prism layer 83 via the second line 82M. According to the present printing method, a printed material 100 that obtains a visual effect because of this difference in refractive angles can be formed. Additionally, because the first line 82C, the second 82M, and the prism layer 83 are formed of ink, it is possible to obtain a printed material 100 having a thin thickness and that can be easily bent or deformed.

2. Exemplary Embodiment 2

Figure 9:
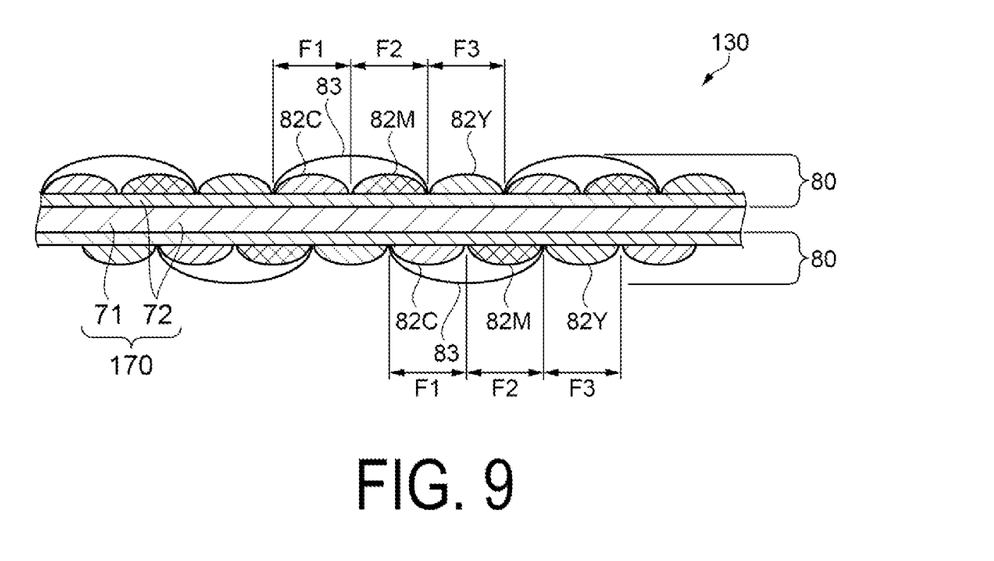
FIG. 9 is a sectional view of a printed material according to Exemplary Embodiment 2.

A constitution of printed material 130 according to exemplary embodiment 2 will now be described. Note that the same constituents as those in Exemplary Embodiment 1 are given the same reference numbers so any redundant description of these constituents will be omitted.

As illustrated in FIG. 9, a medium 170 used in printed material 130 includes a substrate 71, and a specular reflective layer 72 for visible light disposed on a front surface and back surface of the substrate 71. On both sides of the medium 170 are disposed the specular reflective layer 72 of the substrate 71, first to third lines 82C, 82M, and 82Y, and a hologram layer 80 that exhibits a visual effect using the prism layer 83.

Both surfaces of the medium 170 are linear regions; the first region F1, the second region F2, and the third region F3 which are continuous in parallel are divided in a pseudo-manner so that a plurality of continuous regions that are one group are repeated. The first line 82C is formed in the first region F1 and a second line 82M is formed in the second region F2 on both sides of the medium 170, and a third line 82Y is formed in the third region F3.

As described above, according to the printed material 130 according to Exemplary Embodiment 2, it is possible to attain the following effect.

The printed material 130 has a specular reflective layer 72 that imparts the visual effect, first through third lines 82C, 82M, and 82Y, and a prism layer 83 on both sides. As a result, it is possible to improve the visual effect of the printed material 130.

What is claimed is:

1. A printed material comprising: a medium having a specular reflective layer for visible light;

a first line composed of a first color formed by discharging ink onto the medium;

a second line formed by discharging, onto the medium, a second color ink different from the first color, the second line being formed parallel to the first line;

a prism layer formed by discharging ink that does not include a color material at at least the first line; wherein when a portion of the medium is pseudo-divided so that a plurality of continuous regions are formed by repeating a first region, a second region, and a third region, in one set, that are continuous linear regions in parallel, the first line is disposed in any one of the first region, the second region, and the third region in the one set, the second line is disposed in any region other than the region formed with the first line, of the first region, the second region, and the third region in the one set, and the prism layer spans two continuous regions including the region formed with the first line of the first region, the second region, and the third region, in the one set, and is disposed parallel to the linear regions, and a section of the prism layer has a shape of a portion of a non-circular arc that approximates an ellipse.

2. The printed material according to claim 1, wherein a film thickness of the prism layer is thinner than a thickness at which light incident on the prism layer focuses on the first line.

3. The printed material according to claim 1, wherein a third line is disposed in a region not formed with the first line or the second line, of the first region, the second region, and the third region, the third line being formed by discharging, to the medium, a third color ink that is different from the first color and the second color, and the third line being formed parallel to the first line.

4. The printed material according to claim 1, wherein the ink of the prism layer is an ultraviolet light curable ink.

5. The printed material according to claim 1, comprising, on both sides thereof, the specular reflective layer, the first line, the second line, and the prism layer.

6. The printed material according to claim 1, wherein widths of the first through third regions have a resolution of near vision of 1.0 or higher.

7. A printing method comprising:

forming a medium having a specular reflective layer for visible light;

discharging ink onto the medium to form a first line composed of a first color;

discharging, onto the medium, a second color ink different from the first color to form a second line parallel to the first line;

forming a prism layer by discharging ink that does not include a color material onto at least the first line; and when a portion of the medium is pseudo-divided so that a plurality of continuous regions are formed by repeating a first region, a second region, and a third region, in one set, that are continuous linear regions in parallel, the first line is formed in any one of the first region, the second region, and the third region in the one set;

the second line is formed in any region other than the region formed with the first line, of the first region, the second region, and the third region;

the prism layer spans two continuous regions including the region formed with the first line, of the first region, the second region, and the third region, in the one set, and is formed parallel to the linear region, and a section of the prism layer has a shape of a part of a non-circular arc that approximates an ellipse.

8. The printed material according to claim 1, wherein the prism layer and each line are in direct contact.

9. The printed material according to claim 1, wherein the prism layer covers more than ¾ of two adjacent areas.

10. The printed material according to claim 9, wherein the prism layer covers the entire two adjacent areas.

* * * * *